United States Patent
Sakurai (10) Patent No.: US 10,770,703 B2
(45) Date of Patent: Sep. 8, 2020

(54) BATTERY MODULE

(71) Applicant: HONDA MOTOR CO., LTD., Tokyo (JP)

(72) Inventor: Atsushi Sakurai, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 51 days.

(21) Appl. No.: 16/126,096

(22) Filed: Sep. 10, 2018

(65) Prior Publication Data
US 2019/0115573 A1 Apr. 18, 2019

(30) Foreign Application Priority Data

Oct. 13, 2017 (JP) .................................. 2017-199643

(51) Int. Cl.
*H01M 2/10* (2006.01)
*H01M 10/04* (2006.01)
*B60L 50/64* (2019.01)

(52) U.S. Cl.
CPC ........... *H01M 2/1077* (2013.01); *B60L 50/64* (2019.02); *H01M 10/0481* (2013.01); *H01M 2220/20* (2013.01)

(58) Field of Classification Search
CPC .. H01M 2/1077; H01M 10/0481; B60L 50/64
See application file for complete search history.

(56) References Cited

U.S. PATENT DOCUMENTS

2013/0108902 A1* 5/2013 Kristofek ............ H01M 2/1077
429/72
2013/0183571 A1 7/2013 Miyazaki et al.
2018/0358587 A1 12/2018 Tononishi

FOREIGN PATENT DOCUMENTS

| JP | 2012-256466 A | 12/2012 |
|---|---|---|
| JP | 2016-081725 A | 5/2016 |
| WO | WO 2012/043594 A1 | 4/2012 |
| WO | WO 2017/047683 A1 | 3/2017 |

OTHER PUBLICATIONS

Jul. 2, 2019, Japanese Office Action issued for related JP Application No. 2017-199643.

* cited by examiner

*Primary Examiner* — Ula C Ruddock
*Assistant Examiner* — Frank A Chernow
(74) *Attorney, Agent, or Firm* — Paratus Law Group, PLLC (57) ABSTRACT

A battery module includes: a cell stack which is constituted by stacking a plurality of cells, and includes a first surface, a second surface, a third surface, a fourth surface, a fifth surface, and a sixth surface; a pair of end plates which are disposed on the first surface and the second surface of the cell stack; and a pair of connection frames which connect the pair of end plates. The pair of end plates each includes: a plurality of column portions; a plurality of beam portions; and hollow portions formed by the column portions and the beam portions. The pair of end plates each has a uniform width in a stacking direction. In at least one beam portion of the plurality of beam portions, a width of a central portion is greater than a width of both end portions.

8 Claims, 5 Drawing Sheets

BATTERY MODULE

CROSS-REFERENCE TO RELATED APPLICATION(S)

This application claims priority from Japanese Patent Application No. 2017-199643 filed on Oct. 13, 2017, the entire contents of which are incorporated herein by reference.

FIELD

The present invention relates to a battery module mounted on an electric vehicle or the like.

BACKGROUND

In the related art, a battery module is mounted on an electric vehicle or the like. For example, JP-A-2012-256466 discloses a battery module which includes a cell stack, a pair of end plates disposed at both end portions of the cell stack in a stacking direction, and a pair of ladder frames connecting the pair of end plates.

In the battery module of this type, a load (hereinafter, referred to as cell thickness restraint reaction force as appropriate) in a cell stacking direction of the battery module is generated by cell expansion due to temperature change and aging deterioration. In recent years, due to an increase in cell capacity and an increase in energy density, it is in the direction of packing more active material in the cell, and thus the cell thickness restraint reaction force increases.

However, since a battery module of JP-A-2012-256466 includes a pair of end plates with high rigidity and receives cell thickness restraint reaction force at the pair of end plates, there is a concern in that the weight of the end plate and the battery module may increase significantly.

SUMMARY

The invention provides a technique capable of increasing the rigidity of an end plate with respect to cell thickness restraint reaction force while the weight of the end plate is reduced in a battery module.

An aspect of the invention defines a battery module including:

a cell stack which is constituted by stacking a plurality of cells in a first direction, and includes a first surface which is a surface on one end side in the first direction, a second surface which is a surface on the other end side in the first direction, a third surface which is a surface on one end side in a second direction perpendicular to the first direction, a fourth surface which is a surface on the other end side in the second direction, a fifth surface which is a surface on one end side in a third direction perpendicular to the first direction and the second direction, and a sixth surface which is a surface on the other end side in the third direction;

a pair of end plates which are disposed on the first surface and the second surface of the cell stack; and a pair of connection frames which connect the pair of end plates, in which the pair of end plates each includes:

a plurality of column portions extending in the third direction;

a plurality of beam portions extending in the second direction; and hollow portions formed by the column portions and the beam portions, the pair of the end plates each has a uniform width in the first direction, and, in at least one beam portion of the plurality of beam portions, a width in the third direction of a central portion in the second direction is greater than a width in the third direction of both end portions in the second direction.

According to the aspect described above, bending stress generated in an end plate due to cell thickness restraint action force is greater in the central portion than in the end portions in the second direction. Therefore, in the at least one beam portion, the width in the third direction of the central portion in the second direction is set to be greater than the width in the third direction of both end portions in the second direction. Thus it is possible to increase the rigidity of the end plate with respect to the cell thickness restraint reaction force while the weight of the end plate is reduced.

DETAILED DESCRIPTION

Hereinafter, each embodiments of a battery module of the invention will be described with reference to the accompanying drawings. The drawings are to be seen in reference sign directions.

[Battery Module]

Figure 1:
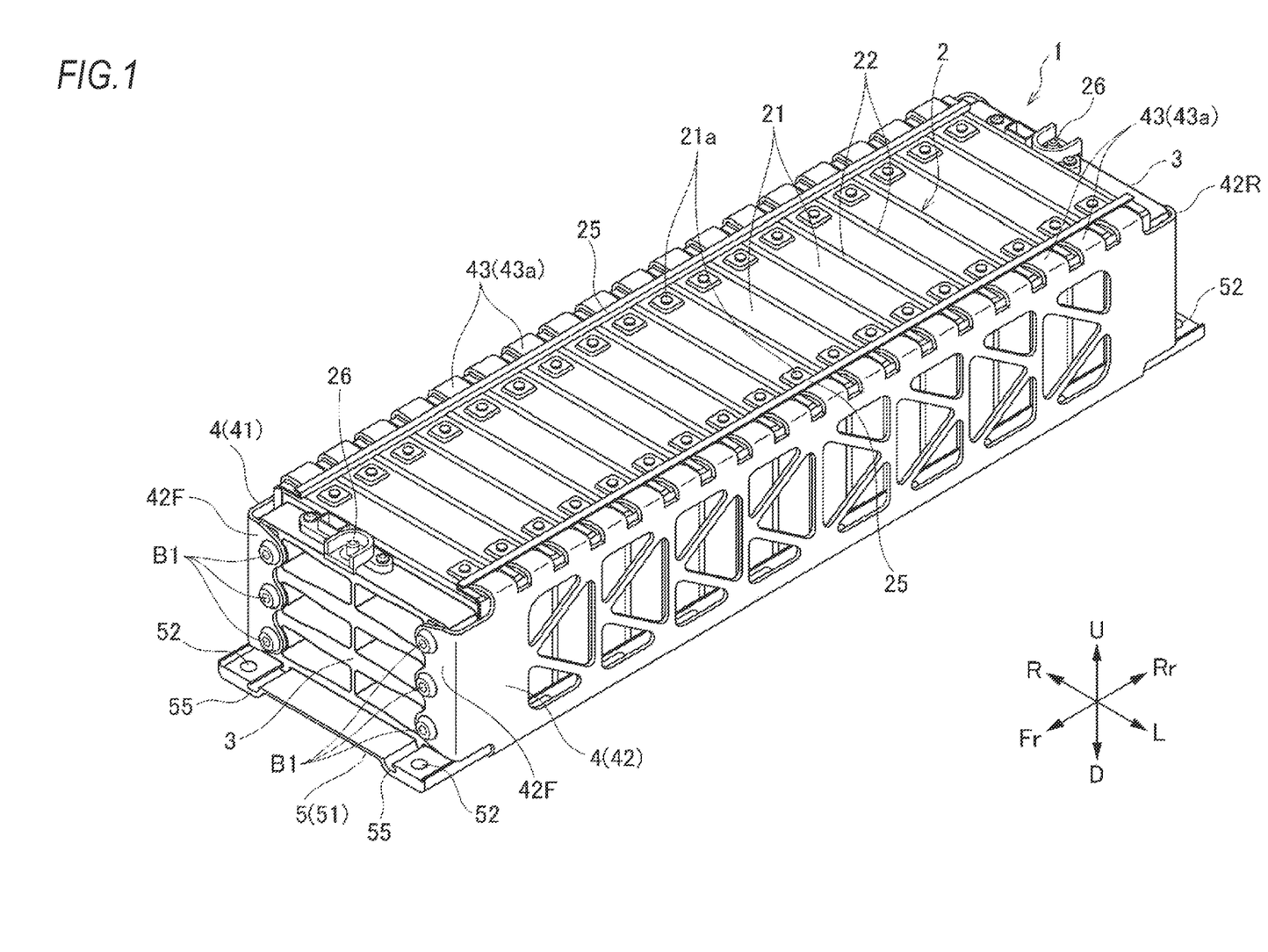
FIG. 1 is a perspective view of a battery module according to a first embodiment of the invention.

As illustrated in FIG. 1, a battery module 1 according to the embodiment includes a cell stack 2 which is constituted by stacking a plurality of cells 21 in a front and rear direction and includes a front surface, a rear surface, a left surface, a right surface, an upper surface, and a lower surface, a pair of end plates 3 disposed on the front surface and the rear surface of the cell stack 2, connection frames 4 which is disposed on the left surface and the right surface of the cell stack 2 and connect the pair of end plates 3, and a base plate 5 which is disposed on the lower surface of the cell stack 2.

In the specification and the like, in order to make the explanation simple and clear, a stacking direction of the cells 21 is defined as the front-rear direction, and directions perpendicular to the stacking direction of the cells 21 are defined as a left-right direction and an up-down direction, and further it is irrelevant to a front-rear direction and the like of a product on which the battery module 1 is mounted. That is, when the battery module 1 is mounted on a vehicle, the stacking direction of the cells 21 may be coincident with a front-rear direction of the vehicle and it may be an up-down direction or a left-right direction of the vehicle, and further it may be a direction inclined from those directions. In the drawing, the front direction of the battery module 1 is denoted by Fr, the rear direction is denoted by Rr, the left side is denoted by L, the right side is denoted by R, the upper direction is denoted by U, and the lower direction is denoted by D.

(Cell Stack)

Figure 2:
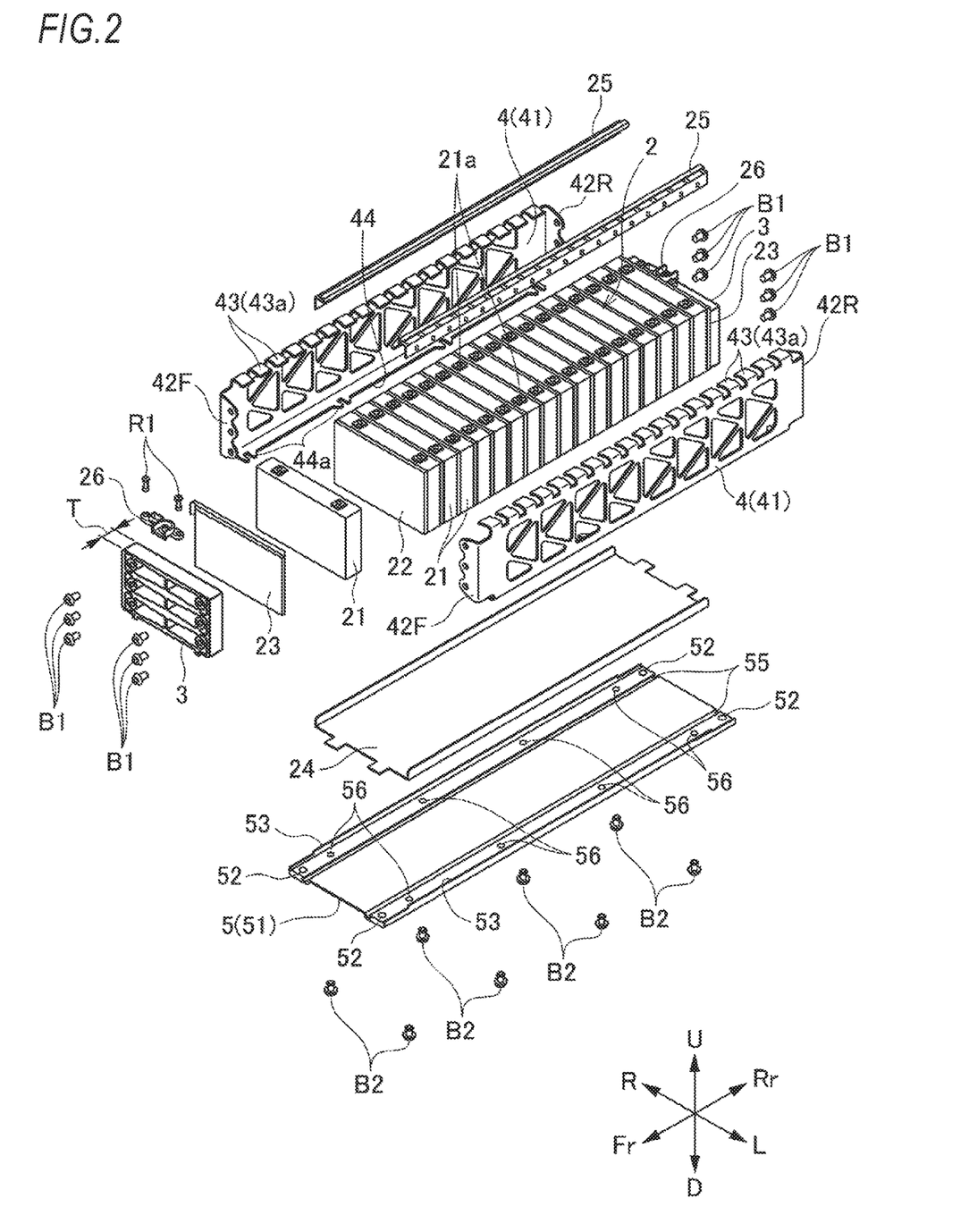
FIG. 2 is an exploded perspective view of the battery module of FIG. 1.

As illustrated in FIGS. 1 and 2, the cell stack 2 is constituted by alternately stacking the plurality of cells 21 and a plurality of first insulating members 22 in the front-rear direction. The pair of end plates 3 are respectively disposed on the front surface and the rear surface of the cell stack 2 in an insulated state via second insulating members 23, and the base plate 5 is disposed on the lower surface of the cell stack 2 in an insulated state via a third insulating member 24. Further, the pair of connection frames 4 is disposed on the left surface and the right surface of the cell stack 2 in an insulated state with a slight gap therebetween. On the upper surface of the cell stack 2, a pair of fourth insulating members 25 is disposed on a left end portion and a right end portion.

It is known that the cell 21 expands due to temperature change and aging deterioration. The cell 21 has a rectangular parallelepiped shape in which the length in an up-down direction is longer than that of a front-rear direction and the length in a left-right direction is longer than that of the up-down direction. Therefore, the area of a front surface or a rear surface of the cell 21 is much larger than the area of a left surface, a right surface, an upper surface, or a lower surface and a central portion in the left-right direction and a central portion in the up-down direction are easily expanded on the front surface and the rear surface of the cell 21.

On the upper surface of the cell stack 2, a plurality of bus bars (not illustrated) electrically connected to terminals 21a of the cells 21 are disposed. The bus bars include bus bars for connecting the terminals 21a of the cells 21 to each other and bus bars for connecting the terminals 21a of the cells 21 to external connection terminals 26. When the plurality of cells 21 constituting the cell stack 2 are relatively positionally shifted in a width direction (left-right direction), stress is generated between the terminals 21a and the bus bars, and thus there is a concern that connection failure may occur. Therefore, it is preferable to prevent the movement of the cells 21 in the width direction as much as possible.

(End Plate)

As illustrated in FIGS. 1 to 4, the pair of end plates 3 respectively abut on the front surface and the rear surface of the cell stack 2 via the second insulating members 23 to receive a load (hereinafter, referred to as cell thickness restraint reaction force as appropriate) in a cell stacking direction of the cell stack 2. The load of the cell stack 2 in the cell stacking direction is mainly caused by expansion of the cells 21 due to temperature change and aging deterioration. As described above, in the front surface and the rear surface of the cells 21, the central portion in the left-right direction and the central portion in the up-down direction are easily expanded, so that a large load is input to the central portion in the left-right direction and the central portion in the up-down direction of the end plate 3.

The end plate 3 is formed by using an aluminum extruded material (extruded product made of aluminum). The end plate 3 is formed by cutting the aluminum extruded material having the same cross-sectional shape continuously in the front-rear direction at a predetermined width, and thus has a uniform width T in the front-rear direction. In addition, the aluminum extruded material has high processing precision, and thus it is possible to eliminate or simplify additional work and the like. The end plate of the embodiment has a rectangular shape when viewed from the front-rear direction and R portions 31 having a predetermined curvature are provided at the four corners thereof.

Figure 3:
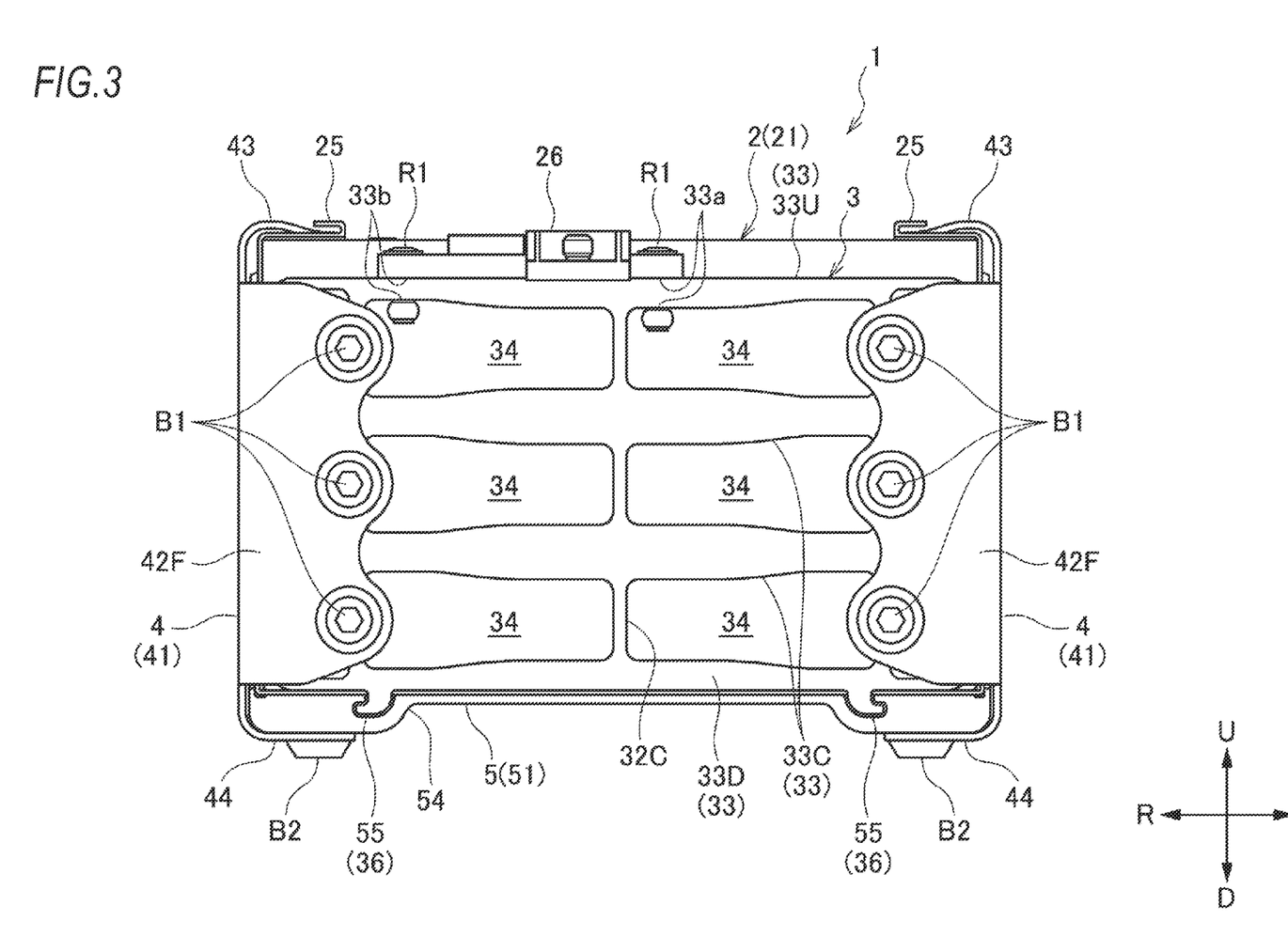
FIG. 3 is a front view of the battery module of FIG. 1.
Figure 4:
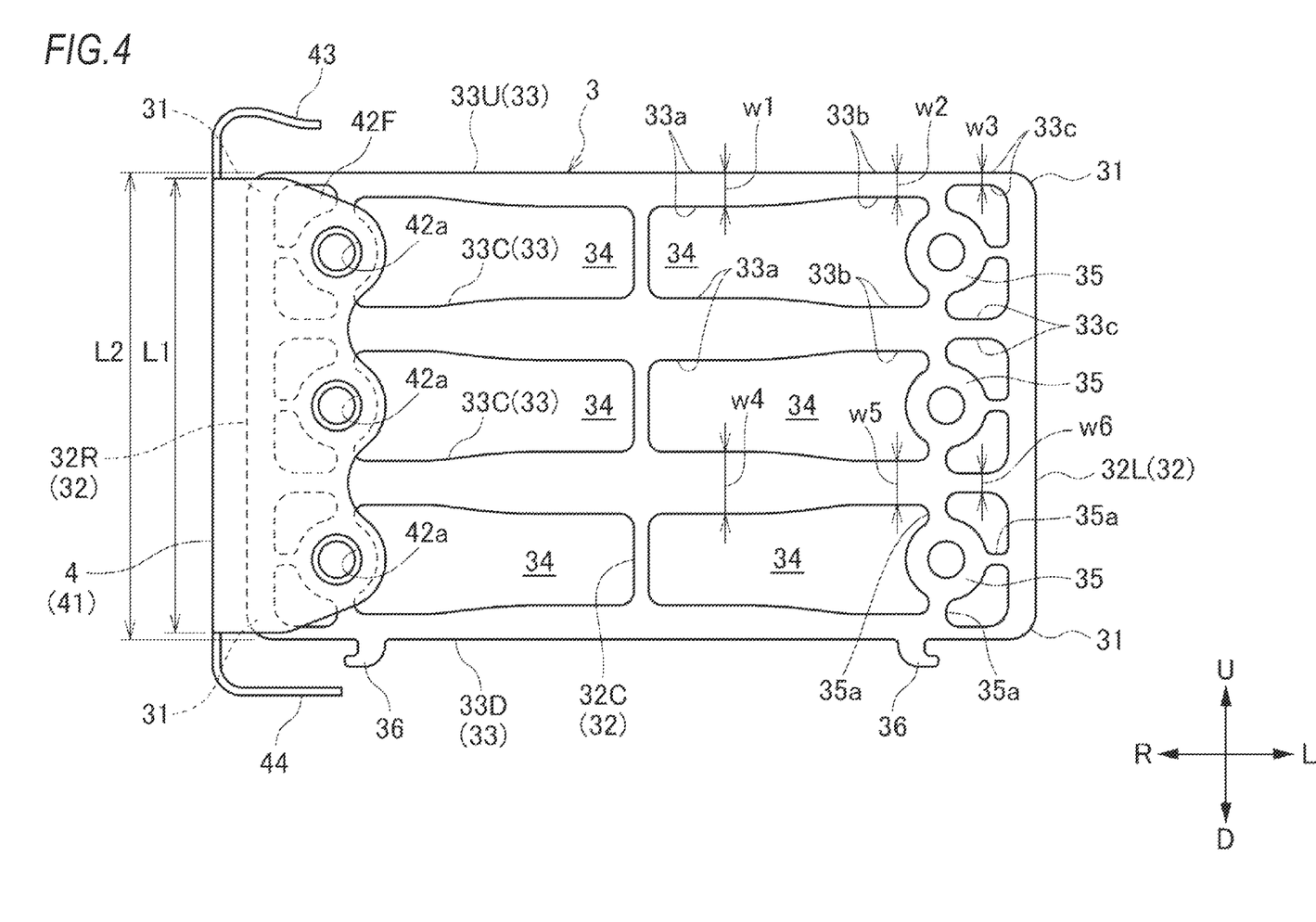
FIG. 4 is a front view illustrating an end plate and a connection frame of the battery module of FIG. 1.

As illustrated in FIGS. 3 and 4, the end plate 3 includes a plurality of column portions 32 extending in the up-down direction, a plurality of beam portions 33 extending in the left-right direction, and hollow portions 34 formed by the column portions 32 and the beam portions 33. Specifically, the end plate 3 of the embodiment includes a central column portion 32C which is provided in the central portion of the end plate 3 in the left-right direction, a left column portion 32L and a right column portion 32R which are provided in a left end portion and a right end portion of the end plate 3 in the left-right direction, four beam portions 33C, 33U, and 33D (two central beam portions 33C provided in the central portion in the up-down direction and an upper beam portion 33U and a lower beam portion 33D provided in an upper end portion and a lower end portion in the up-down direction) connecting the central column portion 32C, the left column portion 32L, and the right column portion 32R, and six hollow portions 34 formed by those column portions 32C, 32L, and 32R and beam portions 33C, 33U, and 33D.

In the upper beam portion 33U and the lower beam portion 33D, a vertical width W1 of the central portion in the left-right direction is greater than a vertical width W2 or W3 of the both end portions in the left-right direction. In the central beam portion 33C, a vertical width W4 of the central portion in the left-right direction is greater than a vertical width W5 or W6 of both end portions in the left-right direction. That is, bending stress generated in the end plate 3 due to the cell thickness restraint reaction force is greater in the central portion than in the both end portions in the left-right direction. Therefore, the vertical width W1 or W4 of the central portion of the beam portion 33C, 33U, or 33D in the left-right direction is set to be greater than the vertical width W2, W3, W5, or W6 of both end portions in the left-right direction. Thus it is possible to increase the rigidity of the end plate 3 with respect to the cell thickness restraint reaction force while the weight of the end plate 3 is reduced by the plurality of hollow portions 34. In particular, in a case of an aluminum extruded material, since the width of the end plate 3 in the front-rear direction is uniform, the rigidity of the end plate 3 can be increased by changing the vertical width of the beam portion 33C, 33U, or 33D.

In the embodiment, the vertical widths W1 and W4 of the central portions of the entirety of the beam portions 33C, 33U, and 33D in the left-right direction are set to be greater than the vertical widths W2, W3, W5, and W6 of both end portions in the left-right direction. However, the vertical widths W1 and W4 of the central portions of only a part of the beam portions 33C, 33U, and 33D in the left-right direction may be set to be greater than the vertical widths W2, W3, W5, and W6 of both end portions in the left-right direction.

The beam portions 33C, 33U, and 33D include pairs of parallel surfaces 33a, 33b, and 33c which are parallel in the front-rear direction and the left-right direction. In the end plate 3 of the embodiment, pairs of parallel surfaces 33a, 33b, and 33c are provided at two positions (33a) of each central portion of the beam portions 33C, 33U, and 33D in the left-right direction and two positions (33b and 33c) of each of both end portions of the beam portions 33C, 33U, and 33D in the left-right direction. Pairs of parallel surfaces 33a, 33b, and 33c are used as external connection terminal fixing portions for fixing the external connection terminals 26.

More specifically, rivet insertion holes (not illustrated), penetrating vertically through the pair of parallel surfaces 33a which are formed in the central portion of the upper beam portion 33U in the left-right direction and the pair of parallel surfaces 33b which are formed in the right end portion of the upper beam portion 33U in the left-right direction, are processed and the external connection terminal 26 is disposed along an upper surface among the pairs of parallel surfaces 33a and 33b, and then the external connection terminal 26 is fixed by rivets R1 inserted into the rivet insertion holes. In this way, the external connection terminal 26 can be securely fixed using the parallel surfaces 33a and 33b of the upper beam portion 33U. Further, the rivet R1 may have a length passing through the upper beam portion 33U in the up-down direction, so that a small rivet having a short shaft portion can be used.

In the embodiment, the external connection terminal 26 is fixed using the parallel surfaces 33a, 33b, and 33c of the beam portions 33C, 33U, and 33D. However, the parallel surfaces 33a, 33b, and 33c of the beam portions 33C, 33U, and 33D may be used for the connection between the base plate 5 and the end plate 3, the connection between a module supporting structure (not illustrated) for supporting the battery module 1 and the end plate 3, the connection between a temperature control device (not illustrated) for controlling the temperature of the cell stack 2 to the end plate 3, or the like.

The end plate 3 includes a plurality of fastening portions 35 fastened to the connection frame 4 via bolts B1 at both end portions in the left-right direction. The plurality of fastening portions 35 have a cylindrical shape extending in the front-rear direction, and are integrated with the beam portions 33C, 33U, and 33D and the column portions 32L and 32 R via a plurality of connection portions 35a.

Furthermore, the end plate 3 includes a plurality of protrusion portions 36 on a surface (lower surface) facing the base plate 5. The protrusion portion 36 of the embodiment has a constant cross-sectional shape continuous in the front-rear direction and has a hook shape bent or curved into an L shape or a J shape. In the end plate 3 of the embodiment, two protrusion portions 36 are provided on both right and left end sides of the lower surface. However, the number of the protrusion portions 36 may be one or three or more and the position where the protrusion portion 36 is provided may be a center side of the lower surface of the end plate 3 in the right and left direction.

(Connection Frame)

As illustrated in FIGS. 1 to 4, the connection frame 4 is formed by pressing a metal plate material and includes a connection frame body 41 extending along the right surface or the left surface of the cell stack 2, a front flange portion 42F which extends from the front end of the connection frame body 41 to be curved to a front surface of the end plate 3 (cell stack 2) on the front side, a rear flange portion 42R which extends from the rear end of the connection frame body 41 to be curved to a rear surface of the end plate 3 (cell stack 2) on the rear side, an upper flange portion 43 which extends from the upper end of the connection frame body 41 to be curved to an upper surface of the cell stack 2, and an lower flange portion 44 which extends from the lower end of the connection frame body 41 to be curved to a lower surface of the base plate 5 (cell stack 2).

The front flange portion 42F and the rear flange portion 42R are provided with a plurality of fastening portions 42a fastened to the end plate 3 on the front side or the end plate 3 on the rear side via the bolts B1. The fastening portion 42a has a round hole through which the bolt B1 is inserted. The bolt B1 inserted into the round hole is screwed into the fastening portion 35 of the end plate 3 on the front side or the end plate 3 on the rear side, in such a manner that the front flange portion 42F and the rear flange portion 42R are fastened to the end plate 3 on the front side or the end plate 3 on the rear side. As a result, the pair of end plates 3 are connected via the connection frame 4.

The connection frame 4 allows the relative displacement of the end plates 3 in the front-rear direction when the load of the cell stack 2 in the cell stacking direction increases. For example, deformation of the connection frame body 41 in the front-rear direction, angular change between the connection frame body 41 and the front flange portion 42F, angular chance between the connection frame body 41 and the rear flange portion 42R, and the like allow relative displacement of the end plates 3 in the front-rear direction.

As illustrated in FIG. 4, both the end portions of the front flange portions 42F and the rear flange portions 42R in the up-down direction overlap with the R portion 31 formed at the four corners of the end plate 3 in the up-down direction. In this way, gaps are secured between both end portions of the front flange portions 42F and rear flange portions 42R in the up-down direction and the end plates 3 by the R portions 31. Therefore, even when the load of the cell stack 2 in the cell stacking direction acts on the end plate 3 and the connection frame 4, it is possible to avoid concentration of stress at both end portions of the front flange portions 42F and the rear flange portions 42R in the up down direction, and thus it is possible to prevent the damage of the connection frame 4.

Further, a vertical length L1 of the front flange portion 42F or the rear flange portion 42R is shorter than a vertical length L2 of the end plate 3. In this way, it is possible to reduce the size of the connection frame 4 while the stress concentration at both end portions of the front flange portion 42F and the rear flange portion 42R in the up-down direction is avoided.

The upper flange portion 43 and the lower flange portion 44 pinch the fourth insulating members 25, the cell stack 2, and the base plate 5 from the up-down direction at a left end portion and a right end portion of the cell stack 2. As a result, it is possible to prevent the relative positional fluctuation of the cell stack 2, the fourth insulating members 25, the connection frame 4, and the base plate 6 in the up-down direction and simultaneously align the plurality of cells 21 constituting the cell stack 2.

The upper flange portion 43 has elasticity, and thus the elastic deformation in the up-down direction is allowed. Therefore, when connection frames 4 are attached to the cell stack 2 and the base plate 5 from the left-right direction, the upper flange portion 43 is elastically deformed to facilitate attachment and simultaneously the cell stack 2 can be elastically pinched between the upper flange portion 43 and the lower flange portion 44 to improve the vibration resistance.

The upper flange portion 43 of the embodiment is constituted by a plurality of elastic pieces 43a aligned in the front-rear direction and a number and position of the elastic pieces 43a are determined in correspondence with a number and position of the cells 21 stacked in the front-rear direction. Thus, the upper flange portion 43 can hold the plurality of cells 21 individually elastically while having moderate elasticity.

In the connection frame 4 of the embodiment, the upper flange portion 43 is press-formed integrally with the connection frame body 41. However, the upper flange portion 43 may be subjected to press-forming separately from the connection frame body 41, and then the upper flange portion 43 may be integrated with the connection frame body 41 by welding or caulking.

The lower flange portion 44 is provided with a plurality of retained portions 44a which are retained to the base plate 5 via bolts B2. The retained portions 44a are cuts opening to the center side of the battery module 1 in the left-right direction and it is possible to attach the connection frames 4 from the left-right direction in a state where the bolts B2 are temporarily fixed to the base plate 6.

(Base Plate)

As illustrated in FIGS. 1 to 3, the base plate 5 is formed by using an aluminum extruded material and includes a base plate body 51 which extends along the lower surfaces of the cell stack 2 and the end plate 3, a plurality of fixing portions 52 which are fixed to a module supporting structure (not illustrated) supporting the battery module 1, guide portions 53 which protrude upward from both end portions of the base plate body 51 in the left-right direction and extend along the front-rear direction, a temperature control device accommodation portion 54 which is recessed in a central portion of the lower surface of the base plate body 51 in the right-left direction, a groove portion 55 which accommodates the protrusion portion 36 of the end plate 3, and a plurality of retaining portion 56 which retain the retained portion 44a of the lower flange portion 44 via the bolt B2.

The fixing portions 52 are provided at the four corners of the base plate body 51 which is rectangular in plan view and is fixed to the module supporting structure via fixing tools such as bolts. According to the fixing structure of the battery module 1, the base plate 5 is fixed to the module supporting structure. Therefore, even when cell pressure restraint reaction force increases by the expansion of the cell 21 due to temperature change and aging deterioration and accordingly the end plate 3 moves in the front-rear direction, stress transmission to module supporting structure can be avoided.

The guide portions 53 protrude upward from both left and right end portions of the base plate body 51 so as to follow the left and right surface of the cell stack 2 and extend along in the front-rear direction. Therefore, when the cell stack 2 vibrates, the displacement of the cell stack 2 in the left-right direction is regulated by the guide portion 53, so that the vibration resistance can be improved.

The base plate body 51 is formed by using an aluminum extruded material and also disposed close to the lower surface of the cell stack 2 as to function also as a heat radiation member for transferring heat of the cell stack 2 to radiate the heat. In addition, in the base plate body 51 of the embodiment, the temperature control device accommodation portion 64 is recessed on the lower surface, and thus a temperature control device can be disposed below the base plate body 51 to control the temperature of the cell stack 2 while the vertical size of the battery module 1 is suppressed.

The groove portions 55 are concave grooves extending in the front-rear direction at both the left and right end portions of the upper surface of the base plate body 51, and accommodate the protrusion portions 36 provided on the lower surface of the end plate 3, in a manner that the displacement of the end plate 3 in the left-right direction is regulated with respect to the base plate 5, while the displacement of the end plate 3 in the front-rear direction with respect to the base plate 5 is allowed. Therefore, the displacement of the end plate 3 in the cell stacking direction is allowed to alleviate the cell thickness restraint reaction force and the movement of the cells 21 in the width direction is prevented, and therefore connection failure between the terminals 21a and the bus bars can be prevented.

The groove portion 55 of the embodiment corresponds to the shape of the protrusion portion 36 formed in the end plate 3 and has a constant cross-sectional shape continuous in the front-rear direction. Further, the groove portion 55 has a hook-like groove shape bent or curved into an L shape or a J shape. According to such groove portion 55, vertical displacement of the end plate 3 with respect to the base plate 5 can also be prevented.

The plurality of retaining portions 56 are formed in both end portions of the base plate body 51 in the right-left direction with a predetermined interval in the front-rear direction. The retaining portions 56 of the embodiment is a threaded hole passing through the base plate body 51 in the up-down direction and the retained portion 44a of the connection frame 4 is retained via the bolt B2 screwed downward.

Second Embodiment

Next, the battery module 1 according to a second embodiment of the invention will be described with reference to FIG. 5. However, the same reference numerals and characters as those of the first embodiment are used for the configurations common to those of the first embodiment, so that the description of the first embodiment is cited.

Figure 5:
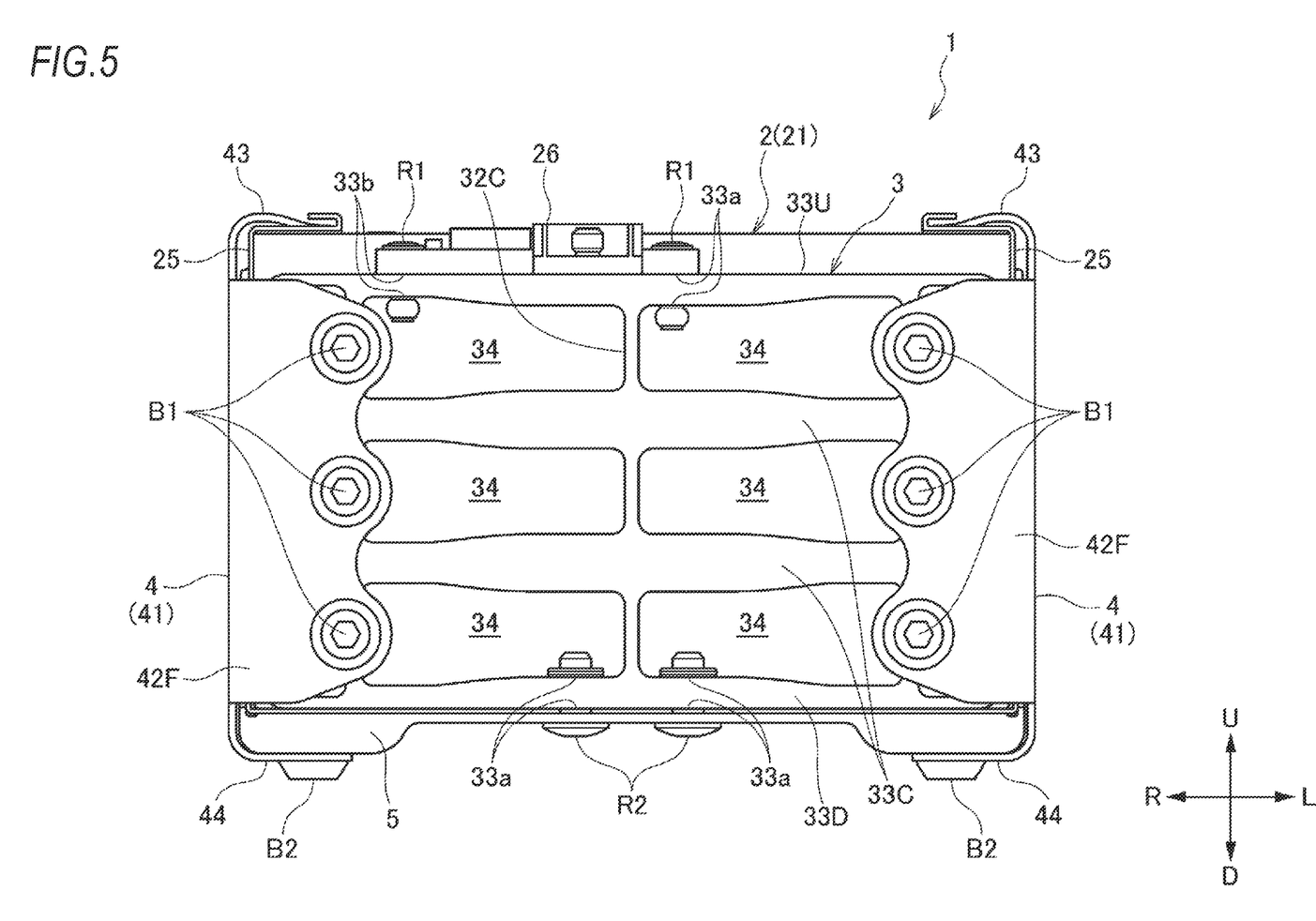
FIG. 5 is a front view of a battery module according to a second embodiment of the invention.

As illustrated in FIG. 5, the battery module 1 of the second embodiment is different from the embodiment described above in that the end plate 3 and the base plate 5 are fastened not via the protrusion portion 36 and the groove portion 55 but via rivets R2. Specifically, rivet insertion holes (not illustrated) penetrating in the up-down direction are processed in a pair of parallel surfaces 33a formed in the central portion of the lower beam portion 33D in the left-right direction and at corresponding positions of the base plate 5, and then the end plate 3 and the base plate 5 are fastened by the rivets R2 inserted through the rivet insertion holes. In this way, it is possible to securely fix the end plate 3 and the base plate 5 using the parallel surface 33a of the lower beam portion 33D.

In addition, it is preferable for the rivet insertion hole to be a long hole which is long in the front-rear direction. In this way, similar to the first embodiment, the movement of the end plate 3 in the front-rear direction can be allowed, while the movement of the end plate 3 in the left-right direction with respect to the base plate 5 is regulated.

The invention is not limited to the embodiments described above and may be appropriately modified, improved, and the like. For example, it is preferable that the end plate 3 be an aluminum extruded material (extruded product made of aluminum), but it may be an extruded material other than aluminum. Further, the end plate 3 is not limited to the extruded material and it may be a cutting material or a casting material.

[Summary]

From the embodiments described above, at least the following aspects are extracted. Although the corresponding constituent elements and the like in the embodiments described above are shown in parentheses, it is not limited thereto.

(1) A battery module (the battery module 1) including:

a cell stack (the cell stack 2) which is constituted by stacking a plurality of cells (the cells 21) in a first direction and includes a first surface which is a surface on one end side in the first direction, a second surface which is a surface on the other end side in the first direction, a third surface which is a surface on one end side in a second direction perpendicular to the first direction, a fourth surface which is a surface on the other end side in the second direction, a fifth surface which is a surface on one end side in a third direction perpendicular to the first direction and the second direction, and a sixth surface which is a surface on the other end side in the third direction;

a pair of end plates (the end plates 3) which are disposed on the first surface and the second surface of the cell stack; and a pair of connection frames (the connection frames 4) which connect the pair of end plates, in which the pair of end plates each includes:

a plurality of column portions (the column portions 32) extending in the third direction;

a plurality of beam portions (the beam portions 33) extending in the second direction; and hollow portions (the hollow portion 34) formed by the column portions and the beam portions, the pair of end plates each has a uniform width in the first direction, and in at least one beam portion of the plurality of beam portions, a width (the width W1 and W4) in the third direction of a central portion in the second direction is greater than a width (the width W2, W3, W5, and W6) in the third direction of both end portions in the second direction.

According to battery module of (1), the bending stress generated in the end plate due to the cell thickness restraint reaction force is greater in the central portion than in the end portion in the second direction. Therefore, in at least one beam portion, the width in the third direction of the central portion in the second direction is set to be greater than the width in the third direction of both end portions in the second direction. Thus it is possible to increase the rigidity of the end plate with respect to the cell thickness restraint reaction force while the weight of the end plate is reduced.

(2) The battery module according to (1), in which the at least one beam portion includes a pair of parallel surfaces (the parallel surfaces 33a, 33b, and 33c) that are parallel in the first direction and the second direction, and an external connection terminal (the external connection terminal 26) of the cell stack is fixed to the pair of parallel surfaces.

According to the battery module of (2), it is possible to securely fix the external connection terminal by using the parallel surfaces of the beam portion. Also, since the end plate has the hollow portions, it is possible to reduce the size of the fixing member.

(3) The battery module according to (1) or (2), in which the pair of connection frames each includes:

a connection frame body (the connection frame body 41); and a pair of wrap-around portions (the front flange portion 42F and the rear flange portion 42R) which extend from the connection frame body to be curved to the first surface and the second surface of the cell stack, the pair of end plates each has a rectangular shape when viewed from the first direction, the pair of end plates each is provided with R portions (the R portions 31) having a predetermined curvature at four corners, and both end portions of the wrap-around portion in the third direction overlap the R portions in the third direction.

According to the battery module of (3), both end portions of the wrap-around portion in the third direction overlap the R portions in the third direction, and thus stress concentration at both end portions of the wrap-around portion can be avoided and damage of the connection frame can be prevented.

(4) The battery module according to (3), in which a length (the length L1) of the wrap-around portion in the third direction is shorter than a length (the length L2) of the end plate in the third direction.

According to the battery module of (4), the length of the wrap-around portion in the third direction is shorter than the length of the end plate in the third direction, and thus the size of the connection frame can be reduced.

(5) The battery module according to any one of (1) to (4), in which the battery module includes a base plate (the base plate 5) disposed on the sixth surface of the cell stack, the pair of end plates each is provided with a protrusion portion (the protrusion portion 36) on a surface facing the base plate, and the base plate is provided with a groove portion (the groove portion 55) which accommodates the protrusion portion and extends in the first direction.

According to the battery module of (5), the movement of the protrusion portion of the end plate in the first direction is allowed by the groove portion of the base plate, that is, the displacement of the end plate in the cell stacking direction is allowed, and thus the cell thickness restraint reaction force of cell stack can be alleviated. On the other hand, the movement of the protrusion portion of the end plate in the second direction is restricted by the groove portion of the base plate, and thus the movement of the end plate in the second direction, that is, the movement of the end plate in a direction perpendicular to the cell stacking direction can be prevented.

(6) The battery module according to any one of (1) to (4), in which the battery module includes a base plate (the base plate 5 of the embodiment described below) disposed on the sixth surface of the cell stack, the beam portion of the end plate facing the base plate includes a pair of parallel surfaces (the parallel surfaces 33a) that are parallel in the first direction and the second direction, and the base plate and the parallel surfaces of the beam portion are fastened by a fastening member (the rivet R2).

According to the battery module of (6), the base plate and the parallel surfaces of the beam portion facing the base plate are fastened by the fastening member, and thus the end plate and the base plate can be securely fixed using the parallel surfaces of the beam portion. Further, the end plate includes the hollow portions, and thus the size of the fastening member can be reduced.

(7) The battery module according to any one of (1) to (6), in which the pair of the end plates each is an extrusion molded product.

According to the battery module of (7), when the end plate is formed by extrusion molding, the parallel surfaces can be formed with high accuracy, and thus the manufacturing cost can be reduced.

(8) The battery module according to any one of (1) to (7), in which the pair of end plates each is an extrusion molded product made of aluminum.

According to the battery module of (8), since the end plate is made of aluminum, the weight of the battery module can be reduced. Further, when the end plate is formed by extrusion molding of aluminum, the parallel surfaces can be formed with high accuracy, and thus the manufacturing cost can be reduced.

The invention claimed is:

1. A battery module comprising:

a cell stack which is constituted by stacking a plurality of cells in a first direction and includes a first surface which is a surface on one end side in the first direction, a second surface which is a surface on the other end side in the first direction, a third surface which is a surface on one end side in a second direction perpendicular to the first direction, a fourth surface which is a surface on the other end side in the second direction, a fifth surface which is a surface on one end side in a third direction perpendicular to the first direction and the second direction, and a sixth surface which is a surface on the other end side in the third direction;

a pair of end plates which are disposed on the first surface and the second surface of the cell stack; and a pair of connection frames which connect the pair of end plates, wherein the pair of end plates each includes:
   a plurality of column portions extending in the third direction;
   a plurality of beam portions extending in the second direction; and
   hollow portions formed by the column portions and the beam portions, the pair of end plates each has a uniform width in the first direction, in at least one beam portion of the plurality of beam portions, a width in the third direction of a central portion in the second direction is greater than a width in the third direction of both end portions in the second direction, and the pair of connection frames each includes:
   a connection frame body; and
   a pair of wrap-around portions which extend from the connection frame body to be curved to the first surface and the second surface of the cell stack.

2. The battery module according to claim 1, wherein
the at least one beam portion includes a pair of parallel surfaces that are parallel in the first direction and the second direction, and
an external connection terminal of the cell stack is fixed to the pair of parallel surfaces.

3. The battery module according to claim 1, wherein
the pair of end plates each has a rectangular shape when viewed from the first direction,
the pair of end plates each is provided with R portions having a predetermined curvature at four corners, and
both end portions of the wrap-around portion in the third direction overlap with the R portions in the third direction.

4. The battery module according to claim 3, wherein
a length of the wrap-around portion in the third direction is shorter than a length of the end plate in the third direction.

5. The battery module according to claim 1, wherein
the battery module includes a base plate disposed on the sixth surface of the cell stack,
the pair of end plates each is provided with a protrusion portion on a surface facing the base plate, and
the base plate is provided with a groove portion which accommodates the protrusion portion and extends in the first direction.

6. The battery module according to claim 1, wherein
the battery module includes a base plate disposed on the sixth surface of the cell stack,
the beam portion of the end plate facing the base plate includes a pair of parallel surfaces that are parallel in the first direction and the second direction, and
the base plate and the parallel surfaces of the beam portion are fastened by a fastening member.

7. The battery module according to claim 1, wherein
the pair of end plates each is an extrusion molded product.

8. The battery module according to claim 1, wherein
the pair of end plates each is an extrusion molded product made of aluminum.

* * * * *